United States Patent Office 3,331,694
Patented July 18, 1967

3,331,694
SINTERED PRODUCT FOR USE IN
FOAMING CERAMICS
Walter Heidrich and Klaus Körner, Urach, Wurttemberg, Germany, assignors to Synfibrit G.m.b.H., Glaus, Switzerland, a corporation of Switzerland
No Drawing. Filed May 31, 1963, Ser. No. 284,345
Claims priority, application Germany, Dec. 24, 1962, S 83,063
3 Claims. (Cl. 106—40)

This invention relates to a process of manufacturing inorganic foam-like bodies and products used therein, and refers preferably to the manufacture of foam-like bodies out of glass-forming silicates, whereby these bodies may constitute articles of various types and sizes of regular or irregular form, such as blocks, plates, profiled articles or granules of small or larger sizes.

There are numerous processes of manufacturing inorganic foam-like bodies, particularly foam-like glass, which are known in prior art. These processes have various drawbacks, some of which are of a basic nature.

In the first place, it is not possible with these prior art processes to produce foam-like bodies of any desired size, particularly very small bodies having completely closed cells. Heretofore, it was necessary to make such small foam-like bodies by splitting or breaking up bodies of larger size. Such broken bodies have open cells at least upon their surfaces of fracture. These open cells would be filled with water or other substances, depending upon the use of the bodies and then the advantage of light weight of foam glass would be eliminated to a great extent. Furthermore, breakage of foam glass produces many outer cracks, while for certain purposes bodies with rounded outer surfaces, having, for example, the shape of pearls, are much more suitable; in addition, such bodies are more resistant to pressure.

Furthermore, prior art processes of manufacturing foam-like glass from glass powder and foam-producing means have a critical phase, namely, the transition from sintering to foaming. As is well known, during sintering glass particles move closer to each other due to the influence of heat and join each other at the areas of contact. A sintered glass mass is in the state of increased density; its volume is greatly diminished in comparison to the loose initial stage, for example, by as much as 60%. On the other hand, foaming obviously produces an increase in volume.

By way of example, when a mixture of glass powder and lamp-black is brought into a form as a uniform layer with a flat outer surface, and is sintered therein, the change in volume results in a non-uniform irregular breaking up and fracturing of the sintered mass into greater and smaller pieces. If the sintered mass is further heated to produce foaming, the broken up pieces of different sizes will be subjected to different heating stages. Foaming will begin in the smaller pieces and in the edge zones of the larger pieces. The foam which is being formed, will act as a heat barrier for the more deeply located zones which have not yet been sufficiently heated. Thus the foaming takes place in a non-uniform manner and faulty formations are produced in the cell structure, such as large and burst cells in the edge zones of the pieces, as well as undeveloped cells in their interiors; furthermore, cavities and air inclusions are formed due to the superposition of layers of earlier and later foaming pieces caused by the detachment of prematurely foaming outer coverings from the core portions. These defective formations in the cell structure cause, among other drawbacks, differences in density within the formed body and varying insulation effects, and also influence the mechanical strength.

Suggestions have been made to eliminate these difficulties by corresponding temperature regulation, namely, by maintaining the mass at a lower sintering temperature until it is thoroughly and completely sintered. Uniform foaming could be achieved then by a quick increase of the temperature to the reaction temperature of the foam-producing medium. However, the above difficulties can be only partly eliminated in this manner, since there is no sharp temperature boundary between sintering and foaming; on the contrary, foaming begins already during the sintering stage.

Another suggestion for the elimination of defective formations in the foam structure consists in notching the layer of glass powder and foam-producing medium, which has been introduced into a form, by pressing a stencil into it or by the use of other suitable devices, so that the layer is separated into uniform sections. This can regulate contraction during sintering. However, even this process can not provide a basic solution of the problem which requires separation from each other of conflicting procedures of contracting during sintering and volume increase during foaming. This prior art process merely makes it possible to reduce the extent of defective formations to a practically acceptable amount. The cause of the described drawbacks is not eliminated, particularly since the extent of separation produced by the notching has a limit for a specific ratio of the thickness of the layer to the size of the notched body.

Finally a suggestion has been made to quickly and thoroughly heat the sintering mass by a skillful manipulation of the supply of the heating temperature during the beginning of the foaming process. Although the use of independently regulatable heating elements makes it possible to provide temperature gradients from high to low and vice versa depending on requirements, thus influencing the direction of the flow of heat in the sintering mass, such use does not provide a basic solution of the problem of keeping separate the effects of oppositely directed flows during sintering and foaming, but provides merely a gradated diminution of the basic drawback and the results thereof.

An object of the present invention is to eliminate these drawbacks of prior art processes of producing foam-like bodies from glass-forming silicates and foaming means.

Another object is to improve the manufacture of foam-like bodies of small and large sizes and of different shapes.

Other objects of the present invention will become apparent in the course of the following specification.

In accordance with the present invention the initial material for the foaming process consists of a condensed preliminary product consisting of the substance to be foamed and of the foaming means.

This condensed preliminary product can be produced in many different ways, for example, by a preliminary pressing of the powdered glass-forming silicates with foaming means, with the possible addition of binders.

The most efficient condensing method was found to consist in sintering the glass-forming silicates which were mixed with the foaming means, by the use of heat. However, the condensing operation can be also carried out by other means, for example by forming a solid body out of a pulverulent glass-forming substance mixed with the foam-producing substance through the use of a suitable binder, such as water glass. This solid body can be then comminuted.

The comminuted product may be sorted and then it is subjected to a foaming operation as a second operational step, which may be separated in time and space from the first one.

The process of the present invention has many substantial advantages over prior art processes. Since the sintering and the foaming can be carried out separately in time and space, the sintering can be carried out by an economical, such as a continuous process, without the use of forms. The subsequent comminution and possible sorting of the sintered mass make it possible to provide the best suitable initial material for the different operational purposes. Among other advantages, the process of the present invention makes it possible to make small foam-like bodies, which may be as small as the size of a sand grain, while this could not be accomplished with any prior art processes. Such a small individual foam-like body having, for example, the size of a fraction of a millimeter, still includes a plurality of closed cells and has a substantially closed outer surface. However, the process of the present invention can be also used for the manufacture of the usual plate-like insulating bodies, or bodies of any desired profile, as well as particularly thick insulating bodies with improved uniform cell structure. Furthermore, it is possible to produce thin foam glass layers in ovens without a protective gas atmosphere, thereby shortening the duration of the cooling.

In accordance with the present invention, the preliminary product is easily produced by sintering the mixture of glass-forming powder with foam-producing means, and then comminuting it. Glass, which may consist, for example, of glass waste fragments, is subjected for this purpose to a preliminary breaking and then is finely ground, preferably with the foam-producing means, in a ball mill or the like. This mixture, the fineness of which is preferably adjusted to correspond to a predetermined sieve mesh, can be brought upon a continuously operating sintering band which is heated by oil, gas or electrically, immediately after leaving the mill. The temperature as well as the speed are set to correspond to the type of glass being treated. The sintering process can be easily controlled and regulated by measurements of density of samples taken at random. In accordance with the present invention, the sintering process is continued until substantially the state of the greatest density of material is attained, so that no greater contraction of the preliminary product takes place during the following foaming treatment.

The comminution of the sintered mass can take place in any desired manner either in plastic condition or after stabilizing.

Granulation with water is also possible. The comminuted sintered product can be sorted into particles of different sizes.

Further treatment of the preliminary product consisting of foaming with heat can be carried out in many different ways.

Thus in accordance with the present invention it is possible, by way of example, to produce foam-like bodies the size of which is so small that it amounts to a fraction of a millimeter, by embedding the preliminary product having a corresponding core size, in a separating material which does not bake together at the foaming temperature and does not combine with the foam, such as stone flour, and then subjecting it to the foaming process. After completion of the foaming operation, the separating material can be sieved off or washed away, and then can be re-employed. It is also possible to prevent the separate grains of the preliminary product to combine with each other during the foaming by initially surrounding them with a separating material. In this manner hollow spaces are initially formed between the particles of the preliminary product which are surrounded by separating layers, whereby the heating operation during the foaming is facilitated.

The combining of the particles can be also prevented without the use of separating means, by subjecting the particles of the preliminary product to the foaming at sufficient distances from each other.

However, the process of the present invention can be also used advantageously to produce larger foam-like bodies, such as plates, insulating covers, profiles and the like. The fine form of the preliminary product which can have a predetermined core structure, makes it possible to develop a particularly uniform heating. Therefore, for all practical purposes the foaming process will take place simultaneously in every part of the mass to be foamed. This is the reason why the present invention makes it possible to produce particularly voluminous form bodies, such as thick plates and blocks, of uniform quality.

The preliminary product can be subjected to the foaming operation upon bands, in forms, in rotary drums, in pit furnaces or furnaces of other types, or in other suitable ways. Furthermore, by way of example, the preliminary product can be subjected to foaming in a free flame flow or in a hot gas current, which may be economically most advantageous for particles of certain sizes.

For special purposes glass forming silicates of particular properties can be used as initial materials and then it is possible to produce foam-like bodies which, for example, may be colored or may have a particularly strong resistance against heat.

Throughout this specification, the term "glass-forming silicates" is used to include also glass and quartz.

The intermediate product according to the invention was produced as follows:

*Example 1*

A glass having the following composition

| | Percent |
|---|---|
| Silicon dioxide | 72 |
| Aluminum oxide | 2 |
| Calcium oxide | 8 |
| Sodium oxide | 15 |
| Magnesium oxide | 3 | was ground in a ball mill to such a degree of fineness that 80% passed a 50$\mu$ sieve. The pulverized glass mass containing, however, also the larger and smaller particles produced during the grinding process was mixed with 0.3 to 1.5% of a carbonaceous foaming agent, such as carbon-black or lamp-black.

The mixture was applied to a sintering band or brought into a pan, i.e. subjected to a continuous or intermittent temperature treatment. The glass mass was exposed to a constant temperature of 850° C. for 4 to 7 minutes, the time of exposure depending on the thickness of the bulk material layer, by which treatment it was brought into a state of utmost density. Due to shrinking the mixture showed at the end of this step irregular crevices.

Subsequently the mass was subjected to a shock-like cooling step, which brought about a splitting up into small irregular particles. In cold state these particles were broken into finer or coarser particles, e.g. in a hammer mill. Classified according to their size, they constituted now the intermediate product for the foaming step.

In order to save energy another alternative would be to emboss the plastic mass by means of an embossing die or a similar tool or to punch it. When subsequently subjected to a shock-like cooling down, the mass will split up into regular parts which do not need a further treatment so that a cooling down to room temperature can be dispensed with.

*Example 2*

The small-size, spherical particles of foamed glass were produced by embedding the sintered, disintegrated intermediate product having approximately the state of utmost density into a pulverulent separating agent of such a kind that, at foaming temperature, said agent will not bake together, nor form a composition, nor enter into reaction, with the intermediate product. Suitable separating agents would be china clay, powdered quartz or similar substances, the melting point of which exceeds the foaming temperature. The bulk thickness of the layer consisting of the intermediate product including the separating agent was between 1 and 5 cm.

The bulk material was exposed to a temperature of 850° C. for 10 to 60 minutes, the time of exposure depending on the granular size of the intermediate product and the thickness of the layer of the separating agent. During such heating process the particles of the intermediate product were inflated to a 10- to 20-fold of their initial size and formed round bodies of foamed glass consisting of several cells. The size of the foam bodies was determined by the particle size of the intermediate product and may, for instance, vary between less than 1 mm. and up to 70 mm. Smaller bodies having a largest dimension of up to 10 mm. needed not to be tempered, but could be quenched in the open air without any special apparatus being necessary. The effect was the same as can be observed with unsplinterable glass, i.e a surface film was formed having an increased pressure resistance. Larger foam bodies were, depending on their size, cooled down to room temperature for 1 to 10 hours in order to avoid any surface cracks or notches.

Subsequently the separating agent was separated from the foamed glass particles by sieving or sifting and could be reused.

*Example 3*

For the purpose of producing small round bodies of foamed glass the sintered, disintegrated and classified intermediate product was embedded in a separating agent for preventing an interlocking of the bodies during the subsequent foaming step.

Suitable separating agents are slurries or dispersions of the stone flours of a high melting point mentioned in Example 2, which were brought into contact with the small-size intermediate product by spraying it thereon or agitating the intermediate product in the slurry or dispersion or in any other suitable way in order to achieve a thin film of separating agent being formed around the particles of the intermediate product.

If the intermediate product is disintegrated in its plastic state, as mentioned in Example 1, a dry stone flour can be used which will satisfactorily adhere to the particles.

The foaming of the enveloped particles of the intermediate product was effected as described in Example 2.

*Example 4*

For the purpose of producing thick plates or slabs, blocks and formed objects of foamed glass, the condensed intermediate product was produced by sintering as described in Example 1. The hot intermediate product was subjected to a shock-like cooling step and disintegrated into grains. This granular, sintered intermediate product proved to have outstanding properties for allowing a uniform introduction of heat into the foaming mass, even at high thicknesses of the layer of the bulk material.

This granular intermediate product was brought into a pan or other suitable container and exposed to a temperature of 850° C., during which step it was uniformly heated up owing to its loose granular structure. Thus a uniform foaming will set in in all regions, even if the thickness of the bulk layer is comparatively high.

Such a treatment results in the forming of a flawless body free of shrink holes even at such thicknesses of the bulk layer as are impossible with all known foaming methods for pulverulent substances, as in these conventional methods the introduction of heat is insufficient. With the glass composition mentioned in Example 1, it is possible to produce for instance a flawless body of foamed glass having a thickness of 20 cm. at a temperature of 850° C. within 50 minutes.

What is claimed is:

1. In the manufacture of foam-like bodies of small size from glass-forming silicates and foam-producing substances, a condensed intermediate product for use in foaming, said product comprising small size particles containing the substance to be foamed and the foam-producing substance, and a separating material which does not bake and does not combine with the foam at foam-producing temperatures, said particles being embedded in said material.

2. An intermediate product in accordance with claim 1, wherein said material consists of stone flour.

3. In the manufacture of foam-like bodies of different types and sizes from glass-forming silicates and foam-producing substances, a condensed intermediate product for use in foaming, said product comprising small size particles containing the substance to be foamed and the foam-producing substance, and a separating covering individually enclosing said particles, said covering consisting of a material which does not bake and does not combine with the foam at foam-producing temperatures.

References Cited

UNITED STATES PATENTS

| | | | |
|---|---|---|---|
| 2,775,524 | 12/1956 | D'Eustachio | 106—40 |
| 2,946,693 | 7/1960 | Booth | 106—40 |
| 2,956,891 | 10/1960 | Booth | 106—40 |
| 3,215,542 | 10/1962 | Tinker | 106—40 |

HELEN M. McCARTHY, *Primary Examiner.*